Patented Feb. 4, 1936

2,029,647

UNITED STATES PATENT OFFICE 2,029,647

ETHYLENE AZO DYESTUFFS AND THEIR MANUFACTURE

Robert Wizinger, Bonn-on-the-Rhine, Germany, assignor to General Aniline Works, Inc., New York, N. Y., a corporation of Delaware No Drawing. Application February 17, 1934, Serial No. 711,730. In Germany February 16, 1933

10 Claims. (Cl. 260—86)

The present invention relates to the manufacture of ethylene azo dyestuffs or acid addition products thereof by coupling with diazonium salts ethylenes of the general formula

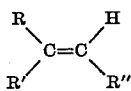

in which R and R' each signify an aryl radical or an aryl radical substituted by an auxochrome and R'' is a monovalent atom or a monovalent group, or acid addition products of such ethylenes.

In accordance with the invention ethylenes of the general formula

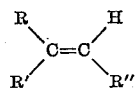

in which R and R' each signify an aryl radical or an aryl radical substituted by an auxochrome and R'' is a monovalent atom or a monovalent group or also acid addition products of these ethylenes are converted by means of diazonium salts into colored carbonium salts, which yield ethylene azo dye-stuffs either spontaneously or after the addition of acid binding agents.

Accordingly, ethylenes of the general formula

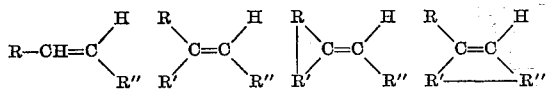

in which R and R' each signify an aryl radical or an aryl radical substituted by an auxochrome and R'' is a monovalent atom or a monovalent group, or also acid addition products of these ethylenes possessing the general formula

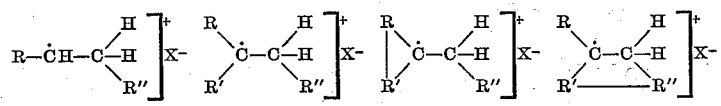

in which R, R' and R'' have the same significance as above and in which X⁻ is an acid anion, such as for example, the anion of hydrochloric acid, hydroiodic acid, sulfuric acid, nitric acid, phosphoric acid, perchloric acid, formic acid, acetic acid, oxalic acid, tartaric acid, benzoic acid, are coupled with diazonium salts to form intensely colored carbonium salts which, as already stated, yield, either spontaneously or after the addition of acid binding agents, azo dyestuffs according to the following scheme:

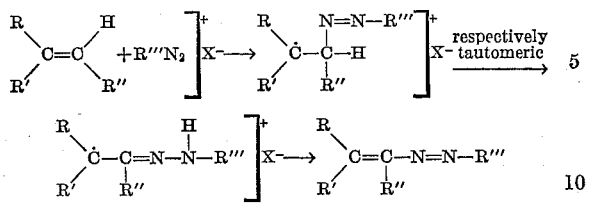

in which R, R', R'' and X⁻ possess the significance already indicated and R''' represents an aryl residue or a substituted aryl residue.

Ethylenes of the type referred to, which may be used for the purposes of the present invention are, for example, those of the general formula

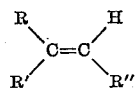

in which R and R' each signify an aryl radical such as a phenyl or naphthyl group, the residue of anthracene, phenanthrene, thiophene, furane, benzofurane or one of these residues substituted by a methyl-, ethyl-, butyl-, phenyl-, naphthyl-, diphenyl- or the benzyl group, a hydroxylamino group or an alkylamino group, such as for example the methylamino-, dimethylamino-, phenylamino-, or butylamino group, a hydroxyl group, a methoxyl group or a halogen atom, such as for example a chlorine or bromine atom and R'' represents a monovalent atom or a monovalent group, such as, for example, a hydrogen, chlorine, bromine or iodine atom, a nitro group, a carboxyl group, a carbonyl group, a sulfonic acid group, an alkyl group, such as for example a methyl-, ethyl- or propyl group, or an aryl or aralkyl group, for example, a phenyl-, naphthyl- or benzyl group. As particular examples of ethylenes of the kind referred to the following may be mentioned: α-methylstyrene, iso-eugenol, isosafrol, isoapiol, α,α-diphenylethylene, α,α-di-biphenylethylene, α-anisyl-α-phenylethylene, α,α-dianisylethylene, α,α-diveratrylethylene, α,α-tetramethyl-diaminodiphenyl-β-methylethylene, α,-α-tetramethyl-diaminodiphenyl-β-phenylethylene, α-dimethylaminophenyl-α-phenylethylene, α,-α-diethoxynaphthylethylene, α,α-dixylyl-β-chlorethylene, dimethylamino cinnamic acid, 9-benzylidene zanthone, 10-methyl-9-benzaldihydro acridone, 1-dimethylamino-4-cyclohexenyl benzene and the like. Instead of the ethylenes indicated the addition products thereof with acids can likewise be employed, such as those derived from hydrochloric acid, hydroiodic acid, sulfuric acid, nitric acid, phosphoric acid, perchloric acid, formic acid, acetic acid, oxalic acid, tartaric acid, benzoic acid and the like.

As diazotizing components there may be used all those amines which find application in the manufacture of azo dyestuffs, such as aniline, phenylene-diamine, benzidine, anthranilic acid, anisidine, naphthylamine, aminoanthracene, aminoanthraquinone, aminophenantherene, aminodiphenyl, aminodiphenylmethane, or also the compounds obtainable by substituting these amines, say for example, by halogen atoms, such as chlorine or bromine atoms, or by nitro- or sulfonic acid groups or by alkyl groups, such as ethyl-, methyl-, propyl- or butyl groups.

By varying the passive components and/or the active components a large number of carbonium salts and ethylene azo dyestuffs has thus become readily accessible.

The invention is illustrated, but not restricted, by the following examples; the parts are by weight:

*Example 1*

3.5 part by weight of amino-2-naphthalene-6,8-disulfonic acid (amino-G-acid) are diazotized in the customary manner, the inner diazonium salt in part separating. This suspension is introduced into a solution of 2.7 parts by weight of tetramethyldiamino-diphenyl-ethylene in a mixture of 2.5 parts by weight of concentrated hydrochloric acid and 25 parts of water. The acid is then neutralized with sodium acetate solution. After a short time the coupling product (I) separates out in small crystals possessing a strong golden green surface lustre. The product is somewhat soluble in water with an intense blue coloration. On treatment with sodium carbonate the somewhat more readily soluble sodium salt of the intensely Bordeaux red azo dyestuff (II) is formed:

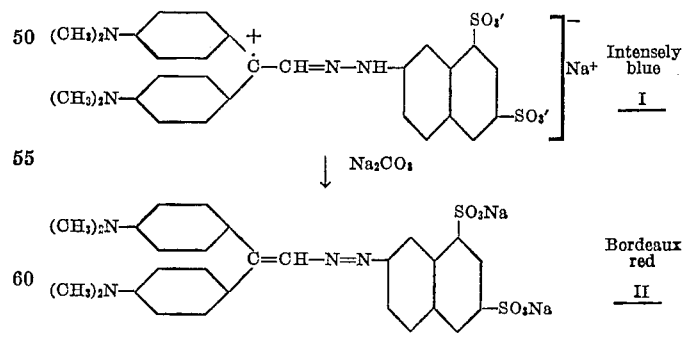

The dyestuff dyes wool Bordeaux red from a bath rendered alkaline by means of sodium carbonate. By means of acid the dyeing is developed to an intense blue.

*Example 2*

A solution of 1.9 parts by weight of nitrophenylantidiazotate in 20 parts by weight of glacial acetic acid is added to a solution of 2.4 parts by weight of dianisylethylene in 200 parts by weight of glacial acetic acid. The liquid quickly becomes intensely reddish orange colored and after about half an hour the azo compound begins to crystallize out. The dyestuff forms dark red small crystals, insoluble in water, but which dissolve in benzene with a reddish orange coloration.

The dyestuff has the following constitution:

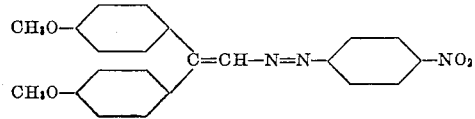

*Example 3*

1.73 parts by weight of sulfanilic acid are diazotized in the customary manner. The suspension of the diazo sulfanilic acid is introduced into a solution of 2.7 parts by weight of tetramethyldiamino-diphenyl-ethylene in 2.5 parts by weight of concentrated hydrochloric acid and 25 parts of water. After a short time the coupling product begins to separate in steel blue small crystals. After about an hour the acid is neutralized with sodium acetate and the reaction mass is allowed to stand for a day. It is then filtered by suction, washed with water and dried at ordinary temperature. The yield amounts to 3.5 parts by weight of dyestuff.

By dissolving in a ten-fold quantity by weight of concentrated hydrochloric acid and precipitating with water the dyestuff can be obtained in a crystalline form. It is a crystalline powder with a steel blue surface lustre, scarcely soluble in water, soluble with a deep blue coloration in alcohol, acetone and glacial acetic acid and readily soluble in sodium carbonate solution with a deep red coloration. The sodium salt can be salted out by means of common salt solution. The latter is readily soluble in water free from salt. The blue inner carbonium salt is re-formed on treatment with acids.

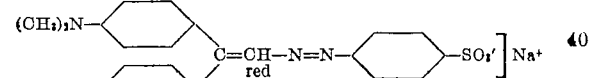

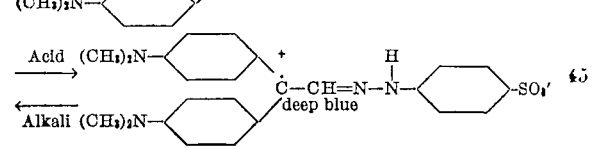

The dyestuff dyes wool deep red shades from a bath rendered alkaline by means of sodium carbonate. The dyeing can be developed to a very intense blue by means of acid.

I claim:
1. Process which comprises coupling a diazotized amine with a material selected from the group consisting of an ethylene of the general formula:

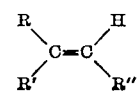

in which R and R' each signify an aryl radical or an aryl radical substituted by an auxochrome and R'' is a member of the group consisting of hydrogen, chlorine, bromine, and iodine atoms, and nitro, carboxyl, carbonyl, sulfonic acid, alkyl, aryl and aralkyl groups and an acid addition product of such an ethylene.

2. The process which comprises coupling a diazotized amine with a material selected from the group consisting of an ethylene of the general formula:

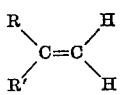

in which R and R' signify an aryl radical or an aryl radical substituted by an auxochrome and an acid addition product of such an ethylene.

3. Process which comprises coupling diazotized amino-2-naphthalene-6,8-disulfonic acid with tetramethyldiamino-diphenylethylene.

4. Process which comprises coupling nitrophenylantidiazotate with dianisylethylene.

5. Process which comprises coupling diazotized sulfanilic acid with tetramethyldiamino-diphenylethylene.

6. Material selected from the group consisting of an azo dyestuff of the formula:

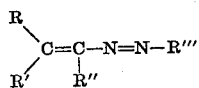

in which R and R' each signify an aryl radical or an aryl radical substituted by an auxochrome, R'' signifies a member of the group consisting of hydrogen, chlorine, bromine, and iodine atoms, and nitro, carboxyl, carbonyl, sulfonic acid, alkyl, aryl, and aralkyl groups, and R''' represents an aryl radical and the acid addition product of such an azo dyestuff.

7. Material selected from the group consisting of an azo dyestuff of the formula:

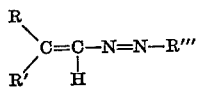

in which R and R' each signify an aryl radical or an aryl radical substituted by an auxochrome, and R''' represents an aryl radical and the acid addition product of such an azo dyestuff.

8. An azo dyestuff of the formula

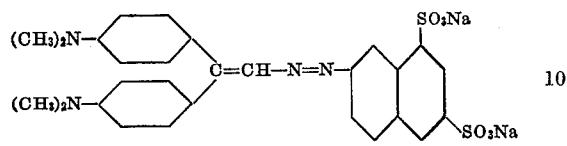

this dyestuff having an intense Bordeaux red color, dyeing wool Bordeaux red from a bath rendered alkaline by means of sodium carbonate, this dyeing being developed to an intense blue by means of acid.

9. An azo dyestuff of the formula

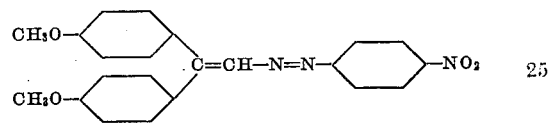

forming dark red small crystals insoluble in water but dissolving in benzene with a reddish orange coloration.

10. An azo dyestuff of the formula

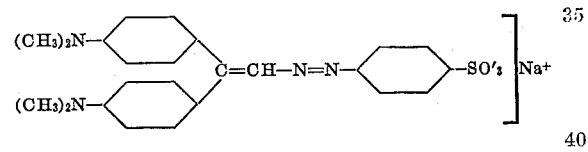

this dyestuff showing a blue surface lustre dyeing wool in deep red shades from a bath rendered alkaline by means of sodium carbonate, this dyeing being developed to a very intense blue by means of an acid.

ROBERT WIZINGER.